(12) United States Patent
Koo et al.

(10) Patent No.: US 8,103,476 B2
(45) Date of Patent: Jan. 24, 2012

(54) ABNORMAL SIMULATION SIGNAL ANALYSIS METHODS AND ABNORMAL SIGNAL SIMULATION ANALYSIS MODULE FOR 4~20MA INSTRUMENTAL SYSTEM

(75) Inventors: Kil Mo Koo, Gyeonggi-do (KR); Ko Ryuh Kim, Daejeon (KR); Dong Ha Kim, Daejeon (KR); Sunhee Park, Daejeon (KR); Soo Yong Park, Daejeon (KR); Kwang il Ahn, Daejeon (KR); Yong Mann Song, Daejeon (KR); Young Choi, Daejeon (KR); Hee Yong Kang, Daejeon (KR); Joon Eon Yang, Daejeon (KR); Jae Joo Ha, Daejeon (KR); Sang Baik Kim, Daejeon (KR)

(73) Assignee: Korea Atomic Energy Research Institute (KR)

( * ) Notice: Subject to any disclaimer, the term of this patent is extended or adjusted under 35 U.S.C. 154(b) by 415 days.

(21) Appl. No.: 12/521,237

(22) PCT Filed: Dec. 28, 2007

(86) PCT No.: PCT/KR2007/006992
§ 371 (c)(1),
(2), (4) Date: Jun. 25, 2009

(87) PCT Pub. No.: WO2008/082222
PCT Pub. Date: Jul. 10, 2008

(65) Prior Publication Data
US 2010/0088059 A1    Apr. 8, 2010

(30) Foreign Application Priority Data

Dec. 29, 2006 (KR) ................... 10-2006-0138871

(51) Int. Cl.
*G01R 27/28* (2006.01)
(52) U.S. Cl. ........................................... 702/120
(58) Field of Classification Search .............. 702/120
See application file for complete search history.

(56) References Cited

U.S. PATENT DOCUMENTS 4,060,716 A     11/1977  Pekrul et al.
6,598,208 B2 *   7/2003  Sasaki et al. .................. 716/115

FOREIGN PATENT DOCUMENTS

JP       5-281390       10/1993
KR    10-2006-0061038    6/2006

OTHER PUBLICATIONS

International Search Report for PCT/KR2007/006992 dated Apr. 28, 2008.

* cited by examiner

*Primary Examiner* — Tung S Lau
(74) *Attorney, Agent, or Firm* — Cantor Colburn LLP

(57) ABSTRACT

The present invention relates to a negative pulse transient signal analysis methods and negative pulse transient signal analysis module for a PC base simulation equivalent circuit capable of grasping and improving error causes through an abnormal signal analysis after configuring a simulation equivalent circuit for a 4~20 mA instrument unsatisfied in a temperature environmental impact assessment.

18 Claims, 12 Drawing Sheets

[Figure 11]
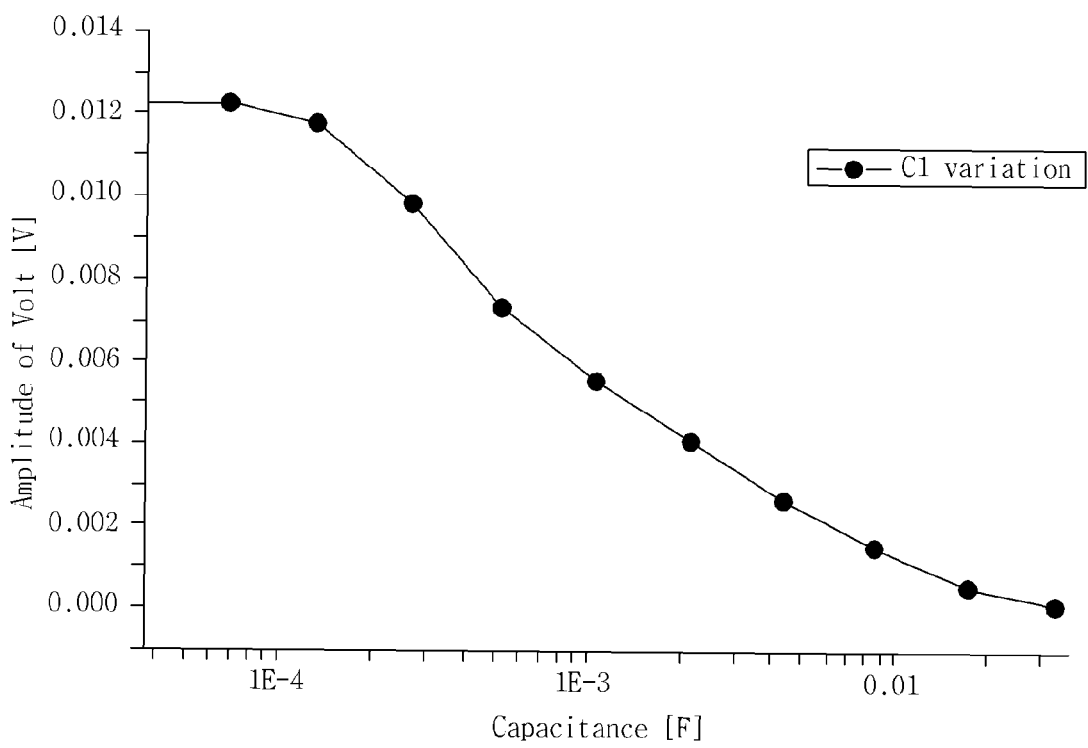

[Figure 12]
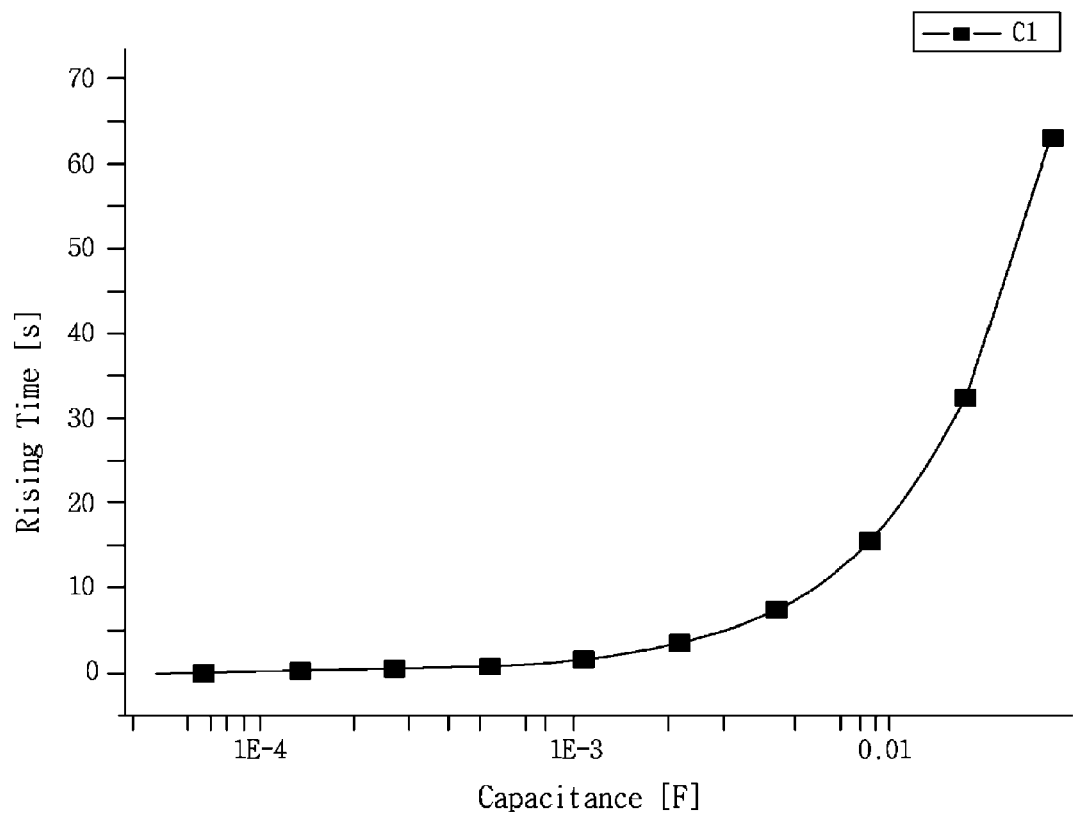

ered directly or indirectly affects the inside of the containment vessel as well as the instrument circuit. A physical change in the instrument circuit due to these accidents makes an open circuit, a ground circuit, or a short circuit, and the like, an extreme state going through an incomplete transition state, wherein error information can be input due to an abnormal signal in a transient state exceeding instrument environmental conditions and design range and judgment errors can be caused due to the error information.

ABNORMAL SIMULATION SIGNAL ANALYSIS METHODS AND ABNORMAL SIGNAL SIMULATION ANALYSIS MODULE FOR 4~20MA INSTRUMENTAL SYSTEM

TECHNICAL FIELD

The present invention relates to abnormal simulation signal analysis methods and abnormal signal simulation analysis module for 4~20 mA instrumental system capable of grasping and improving error causes through an abnormal signal analysis after configuring a simulation equivalent circuit for a 4~20 mA instrument unsatisfied in a temperature environmental impact assessment.

BACKGROUND ART

Generally, high-temperature heat is generated within a containment building of a nuclear power plant by a severe accident due to direct heat, design basis events, or a loss accident of an air cooling apparatus, etc. The high heat generated directly or indirectly affects the inside of the containment vessel as well as the instrument circuit. A physical change in the instrument circuit due to these accidents makes an open circuit, a ground circuit, or a short circuit, and the like, an extreme state going through an incomplete transition state, wherein error information can be input due to an abnormal signal in a transient state exceeding instrument environmental conditions and design range and judgment errors can be caused due to the error information.

Therefore, a need exists for analysis methods and analysis apparatuses capable of quantitatively analyzing the causes of the failure circuits from the error information through a transient signal analysis technology, under a degradation condition in circuit elements due to the physical change in the instrument caused by the high-temperature environment that is the severe accident affecting the nuclear power plant.

A need is raised to establish an instrument survivability assessment and schemes capable of measuring severe accidents with respect to defective instruments, according to SECY 89-012 "Staff plan for accident management regulatory and research programs" request procedure enacted after a "Three Mile Island" accident together with the aforementioned problems. However, what is proposed as the scheme for measure the accidents until now applies a simple function of PSpice. This is only a research result of Electric Power Research Institute (EPRI) (USA) that describes an error validation (point or range) for the equivalent circuits of some instruments according to the environmental conditions and suggests only problems of matters described in this report.

Since an improvement of safety technology due to an increased operational rate of a nuclear power plant has been raised as an important problem in a field of nuclear power generation, assessment methods and apparatuses with high accuracy meeting an instrument survivability assessment, which is one of important elements of accident management plan, are urgently needed. In particular, in order to maximally use the assessment method or the assessment apparatus, it is to be able to perform a quantitative analysis such as a simulation experiment, reconstruction with respect to an abnormal condition, etc., as well as a qualitative analysis such as a decision on whether there is an error in an actual situation. Also, in order to maximally use the assessment apparatus, a field worker is to be able to conveniently use the assessment apparatus by easily connecting it to the instrument.

DISCLOSURE

Technical Problem

The present invention is to meet the aforementioned needs. An object of the present invention is to provide abnormal simulation signal analysis methods and abnormal signal simulation analysis module for 4~20 mA instrumental system capable of grasping and improving error causes through an abnormal signal analysis after configuring a simulation equivalent circuit for a 4~20 mA instrument unsatisfied in a temperature environmental impact assessment.

Technical Solution

In order to accomplish the technical problem, the present invention relates to abnormal simulation signal analysis methods and abnormal signal simulation analysis module for 4~20 mA instrument unsatisfied in a temperature environmental impact assessment, the abnormal signal simulation analysis module includes a circuit simulator module capable of configuring a simulation equivalent circuit of the instrument and obtaining an output signal by inputting a negative pulse; an analysis module receiving the output signal output from the circuit simulator module and then analyzing it; and an abnormal simulation signal analysis module including a system linking module that links the circuit simulator module to the analysis module.

Preferably, the system linking module has a one body code order system. Preferably, the circuit simulator module and the analysis module on the system linking module can be changed.

Preferably, the circuit simulator module includes a function of estimating variation of time constant of the equivalent circuit according to variation of temperature. Preferably, the circuit simulator module includes a function of estimating variation of element according to the variation of time constant. Preferably, the circuit simulator module includes a function of analyzing accident conditions of the instrument according to the variation of element.

Preferably, the analysis module includes a function of classifying and assessing the instrument in an abnormal condition according to a result of a survivability assessment method and a function of validating a signal processing result. Preferably, the analysis module includes an I/O interface function connectable to meters installed on the spot.

More preferably, the abnormal simulation signal analysis module reconstructs the abnormal signal in a transient state to a signal in a normal state.

In another aspect of the present invention, the present invention relates to a signal analysis method for 4~20 mA instrument unsatisfied in a temperature environmental impact assessment, the signal analysis method includes: a first step of configuring a simulation equivalent circuit of the instrument; a second step of obtaining an output signal by inputting a negative pulse to the equivalent circuit; a third step of receiving the output signal output from the second step and analyzing it. Preferably, the first to third steps are performed according to a one body code order system.

Preferably, the second step includes a second-first step of estimating variation of time constant of the equivalent circuit according to variation of temperature. Preferably, the second step includes a second-second step of estimating variation of element according to the variation of time constant. Preferably, the second step includes a second-third step of analyzing accident conditions of the instrument according to the variation of element.

Preferably, the third step includes a third-first step of classifying and assessing the instrument in an abnormal condition according to a result of a survivability assessment method. Preferably, the third step includes a third-second step of validating a signal processing result. Preferably, the third step includes a third-third step of directly connecting to meters installed on the spot.

In still another aspect of the present invention, the present invention provides a recording medium readable with a computer in which a program for realizing the aforementioned abnormal simulation signal analysis method is stored.

Advantageous Effects

With abnormal simulation signal analysis methods and abnormal signal simulation analysis module for 4~20 mA instrument unsatisfied in a temperature environmental impact assessment, assessment accuracy on instruments in a power plant can be improved in environmental conditions introducing a severe accident according to an instrument survivability assessment, which is an important element of an accident management plan for a user regulated in SECY 89-012 "Staff plan for accident management regulatory and research programs" and measured information can be consistently maintained and the instrument survivability assessment method for a nuclear power plant can be provided, while the severe accidents occur.

DESCRIPTION OF DRAWINGS

The above and other objects, features and advantages of the present invention will become apparent from the following description of preferred embodiments given in conjunction with the accompanying drawings, in which:

FIG. 11 is an exemplification view showing response characteristics of the output voltage in the output parameter according to the variation of capacitance C1; and FIG. 12 is an exemplification view showing response characteristics of rising time Tr in the output parameter according to the variation of capacitance C1.

BEST MODE

The present invention describes a MultiSIM engine as a tool configuring a simulation equivalent circuit as a circuit simulation module and analyzing response characteristics in a transient state, but is not limited thereto. The commercial engine may be upgraded (replaced) when more advantageous, convenient, and accurate engine comes into the market. The MultiSIM engine module includes the MultiSIM as a commercial engine for comparative analysis to verify accuracy of derived results and an existing PSpice code. Also, the present invention discloses a use of a LabView analysis module as an analysis module, but the analysis module can be directly manufactured as a program.

Hereinafter, unnecessary parts will be omitted in order to clear understanding of the technical subject of the present invention with reference to accompanying drawings, wherein the omitted parts follows a negative pulse signal analysis method and an apparatus thereof.

Figure 1:
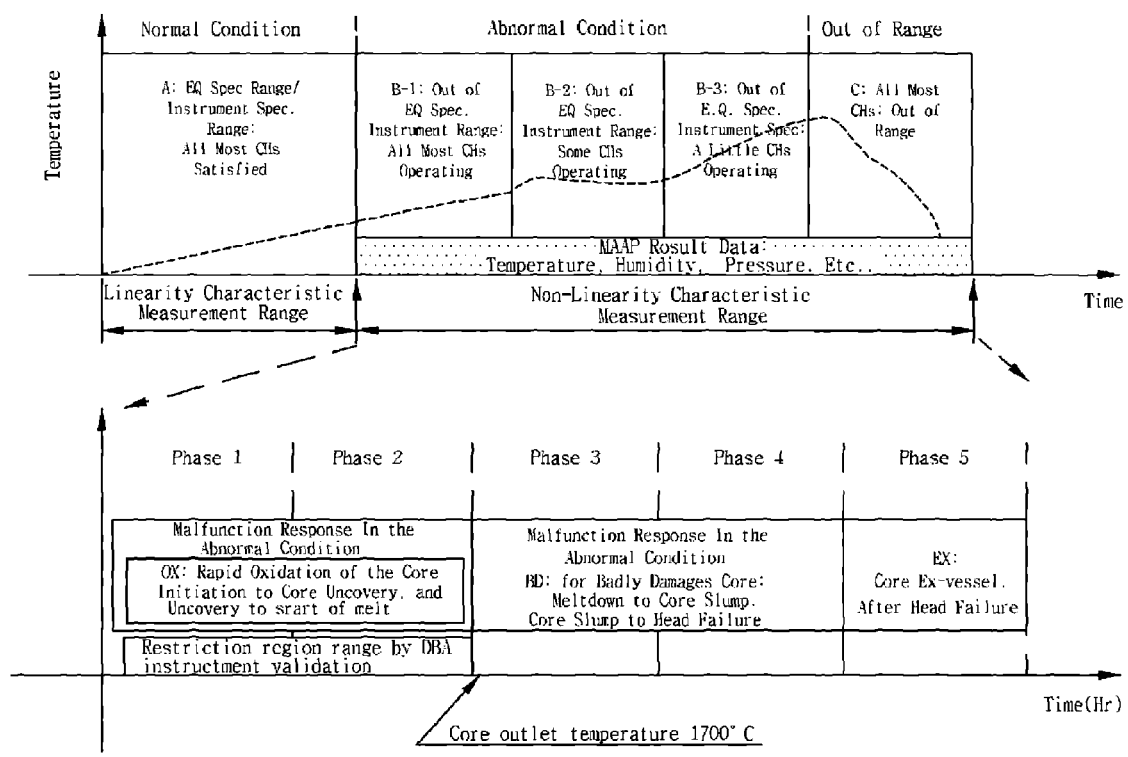
FIG. 1 is an exemplification view showing comparison results of a specification for an instrument survivability assessment or a 3 region of EQ with an environmental (temperature) function of an accident scenario region 5 Phase (accident time) according to a MAAP code.

FIG. 1 is an exemplification view showing comparison results of a specification for an instrument survivability assessment or a 3 region of EQ with an environmental (temperature) function of an accident scenario region 5 Phase (accident time) according to a MAAP code. Concretely describing this, inherent specification information (EQ durability information) of an instrument compares and assesses accident scenario information (temperature, pressure, water level, humidity) with an EQ environmental condition according to a 5 Phase failure section and according to a kind and a position of instrument. With such an assessment method, it is divided into a normal region maintaining durability of an EQ range and a normal condition, an abnormal condition, and an out of range region according to the MAAP scenario region 5 Phase. Herein, a satisfied instrument region, which is a region not exceeding the EQ environmental condition, is considered to be the normal condition region and a unsatisfied instrument region is divided into a error abnormal condition region that is a transient state exceeding the EQ environment and a region exceeding a error abnormal region signal (out of range) region that is a transient state exceeding the EQ environment. In FIG. 1, Phase 1 corresponds to an accident start step, Phase 2 corresponds to a core exposure step and a core melting start step accordingly, and Phase 3 corresponds to a rearrangement step of a reactor vessel according to the core melting start. Also, Phase 4 shows a start of the reactor vessel failure (molten core material flowing in the containment building) after the rearrangement of the reactor vessel and Phase 5 shows the reactor vessel failure and the containment building breakage step as a graph of temperature to time.

Figure 2:
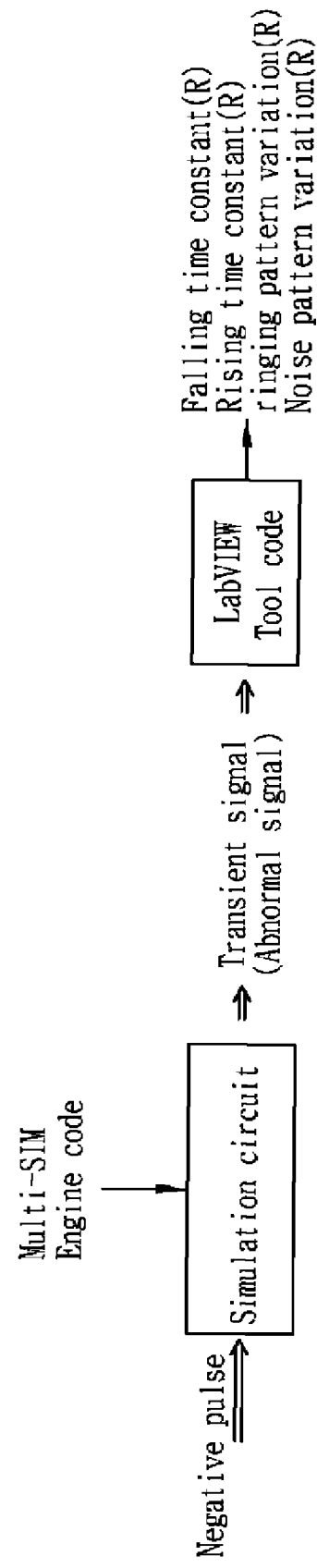
FIG. 2 shows a flow of signal analysis module data according to the present invention.
Figure 3:
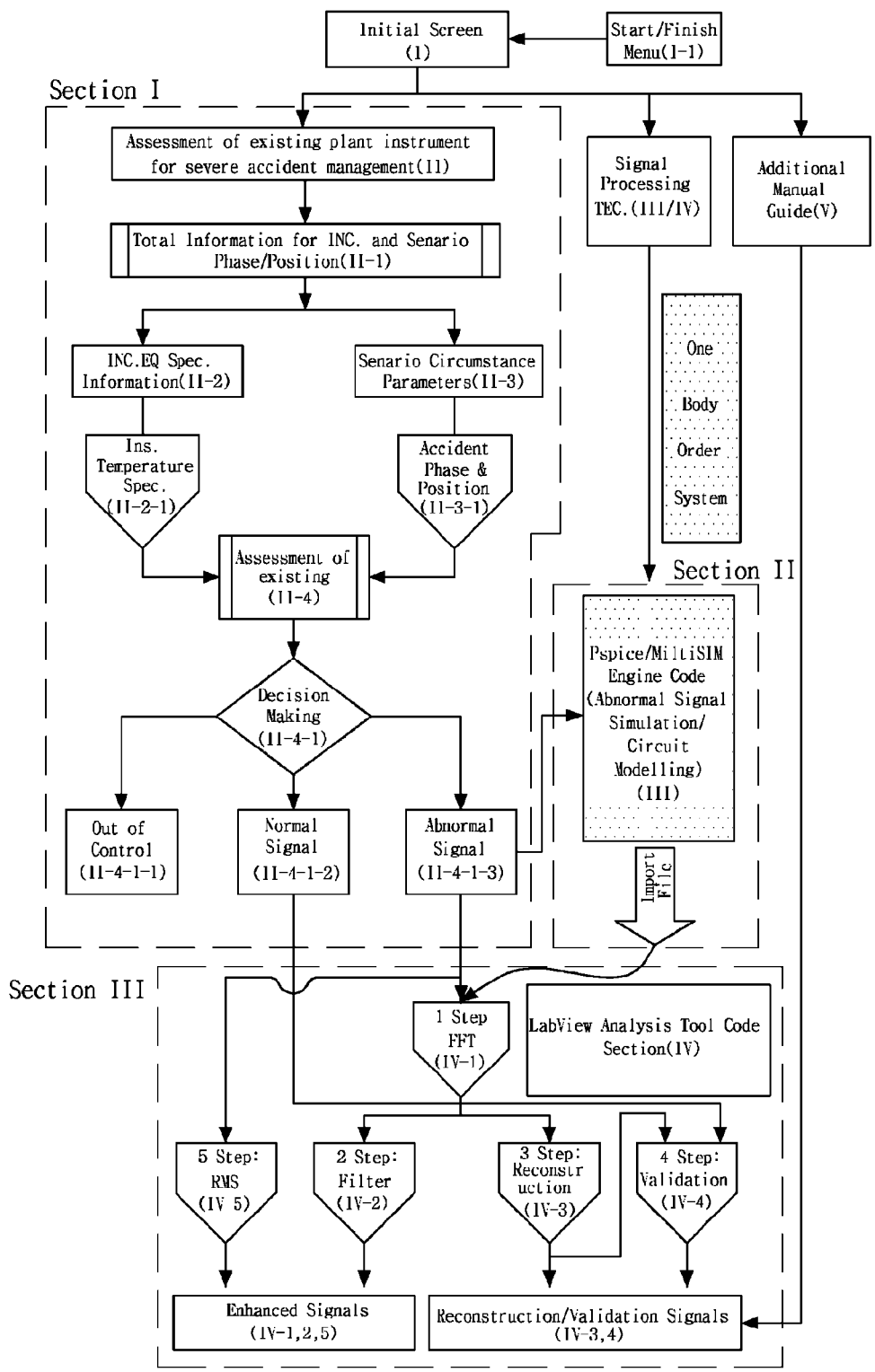
FIG. 3 shows an overall flow of an ASSA module design to which an instrument assessment method is applied.

FIG. 2 shows a flow of signal analysis module data according to the present invention and is a basic concept view to configure a simulation circuit in connection with the abnormal condition region and then analyze it in LabView. FIG. 3 shows an overall flow of an ASSA module design to which an instrument assessment method is applied. A block (I-1) has start and finish functions of an initial screen (I). A section I is a procedure flow diagram to which EPRI TR-103412 "Assessment of existing plant instrument for severe accident management" instrument survivability assessment method. Herein, a block (II) is a step for applying EPRI TR-103412 "Assessment of existing plant instrument for severe accident management" instrument survivability assessment method. In detail, a block (II-1) includes all data information according to an instrument specification or EQ information and an environmental (temperature) function of an MAAP accident scenario, a block (II-2) is a menu of detail information selection in a block (II-2-1) including only instrument information, and a block (II-3) is a menu of detail environmental data information selection in a block (II-3-1) including only an accident scenario. As a result of an application of the aforementioned instrument survivability method in a block (II-4), a block (II-4-1) performs an assessment decision on the instrument specification or the EQ environment and the environmental (temperature) function of the accident scenario according to a function of time Phase. In other words, if the specification or the EQ environment (specification/EQ temperature) value is above the environmental function (environmental temperature) value, a satisfied state is achieved. If the specification or the EQ environmental (specification/EQ temperature) value is below the environmental function (environmental temperature) value, a unsatisfied state is achieved.

Such an assessment decision does not require a series of tasks for a signal processing in the normal condition block (II-4-1-2) that is a satisfied state. In the unsatisfied state, it is divided into a block (II-4-1-3) of an error abnormal signal region that is a transient state and a block (II-4-1-1) of an error signal region exceeding an application range of a signal processing technology. The present patent handles a error abnormal signal region (II-4-1-3 block region) that is a transient state in the corresponding unsatisfied state, forms data by means of the abnormal signal simulation step block (III), that is, the PSpice/MultiSIM engine code in the case of the abnormal signal region, and processes it in a signal processing section II. At this time, the simulated abnormal signal has signal analyzing, improving, and reconstructing functions (Section III) in a block (IV), which is a signal analysis step, by means of an application of the LabVIEW code.

More specifically, as can be appreciated from the Section I, the three kinds of assessment regions are handled, that is, the satisfied instrument region block (II-4-1-2) is handled as a region not exceeding the EQ environment, that is, the normal signal condition region, the unsatisfied instrument region block (II-4-1-3) is handled as the error abnormal region signal region that is a transient state exceeding the EQ environment, and the unsatisfied instrument region block (II-4-1-1) is handled as the complete error abnormal region exceeding the EQ environment, that is, the region exceeding the signal processing region.

As can be appreciated from the Section II, this is a signal processing section and performs the abnormal signal simulation function. This corresponds to the PSpice/MultiSIM engine simulation code Section and performs a simulation function of the abnormal signal through the equivalent circuit on the error abnormal region signal that is a transient state exceeding the EQ environment in the unsatisfied region block (II-4-1-3).

In the section III, the signal analyzing, improving, and reconstructing functions are performed. This may use the LabVIEW analysis code. Herein, a first step FFT frequency analysis function block (IV-1) is an output analysis signal indication block and a second step filter function block (IV-2) is an output improvement signal indication block. Also, a third step reconstruction function block (IV-3) is an output reconstruction signal indication block and a fourth step signal validation function block (IV-4) is an output validation signal indication block. Finally, a RMS processing function block (IV-5) is an output improvement signal indication block.

For reference, a block (V) includes an accident management guideline manual accessing menu.

Figure 4:
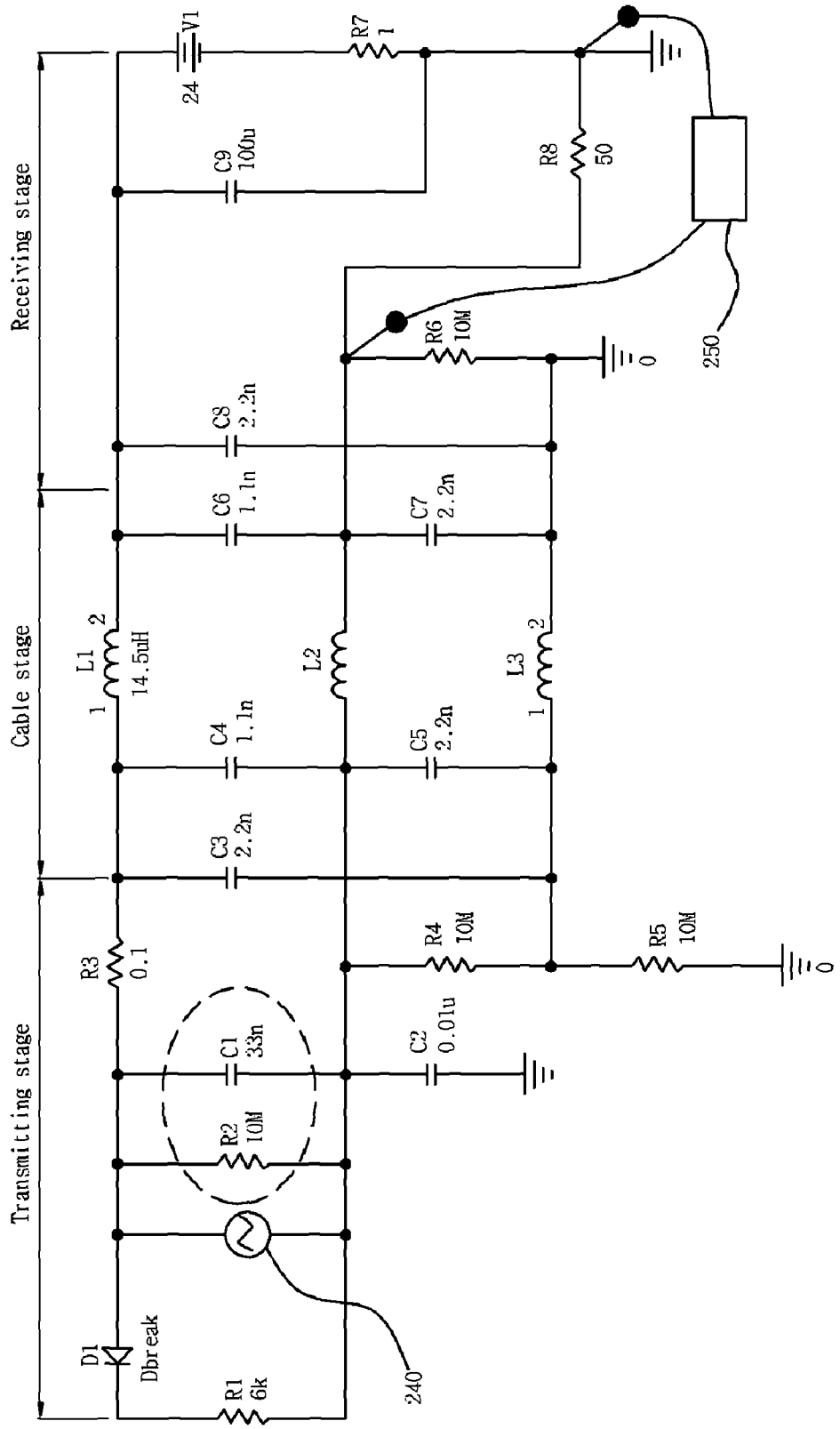
FIG. 4 is a circuit diagram of a simulation equivalent circuit of an instrument according to the present invention.

FIG. 4 is a view showing a configuration embodiment of 4~20 mA instrument simulation equivalent circuit using a MultiSIM engine module. As shown in FIG. 4, there is shown a circuit diagram configured of passive elements such as a resistor, a coil, and a condenser and a diode, etc in order to replicate the instrument that is an analysis object. In the equivalent circuit, an input wave generator 240 is replicated to an input terminal and an oscilloscope 250 is replicated to an output terminal. A negative pulse with various forms and characteristics can be inputted through the input wave generator 240 and the output of the circuit diagram by the input pulse is observed by the oscilloscope 250. Of course, the results of the output wave can be automatically imported to the labVIEW analysis module.

In other words, if a predetermined reference negative pulse is applied to the input terminal 240, when in a 4~20 mA pressure equipment simulation equivalent circuit normal elements are R1, R2, R3, R4, C1, C3 elements, parameters of a negative output pulse are measured in the oscilloscope 250. The parameters of the negative output pulse may be divided into variation of voltage amplitude, a rising time of pulse, a bandwidth of pulse, a rising time, and variation of pulse amplitude. Next, the oscilloscope 250 measures modified parameters of the negative pulse in the output according to the variation of the respective elements are measured by selecting one of R1, R2, R3, R4, C1, C3 elements, which are the input terminal elements of the 4~20 mA pressure equipment simulation equivalent circuit. The variation of the negative pulse of the output with respect to the variation of the elements is built as a database. This analysis is performed on all the R1, R2, R3, and R4. The parameter variation every the variations is built as a database. The output parameter analysis is performed on the condensers of C1 and C2 at the same level. Such database values may be reconstructed by a graph of volt size according to the variation of resistance. The linearity variation of the negative pulse parameter according to the variation of the element may be changed into the temperature function using voltage/current change characteristic curve according to the variation of temperature. Consequently, since a correlation equation of the resistance variation of the element according to the temperature variation is obtained by associating and applying the information on the linearity variation of voltage from the variations of the R1, R2, R3, R4, C1, and C2 elements by means of the MultiSIM engine module and the LabVIEW module with the characteristic curve, the abnormal signal aspect of the output can be analyzed according to the temperature environment affecting the elements (resistance+coil+condenser) that are distributed constant of the equivalent circuit). Consequently, the function as the dedicated signal analysis module capable of analyzing the error signal (abnormal signal) analysis affected by the temperature environment and the reconstruction of the normal signal by means of the quantitative analysis of the error range can be achieved.

Figure 5:
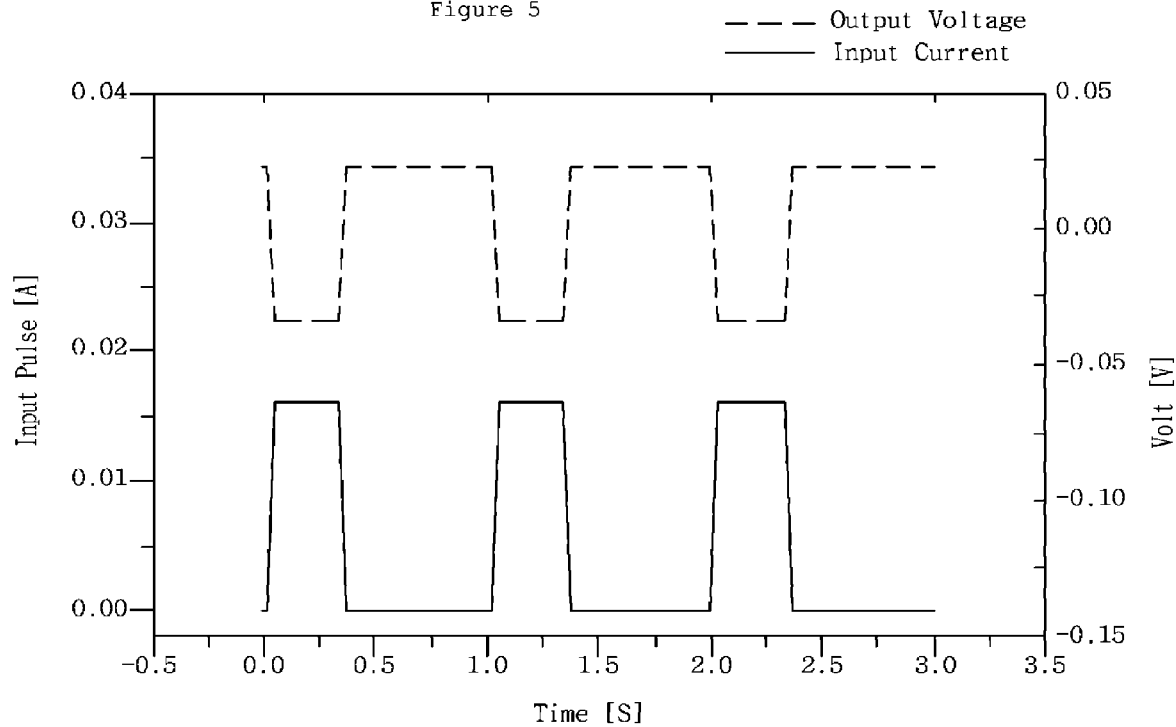
FIG. 5 is an exemplification view showing input current and output voltage using a pulse parameter as an initial value.

Herein, FIG. 5 is an exemplification view showing input current and output voltage using a reference pulse parameter as an initial value.

Figure 6:
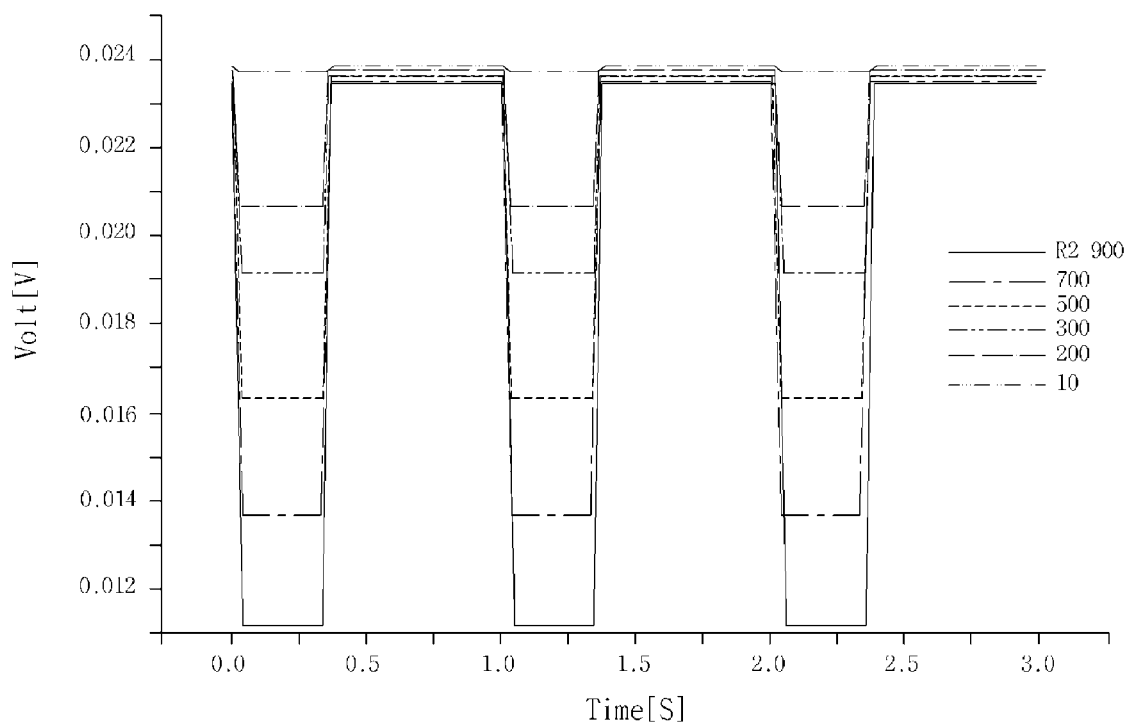
FIG. 6 is an exemplification view showing variation of the output voltage in the pulse parameter according to variation of resistance R2.
Figure 7:
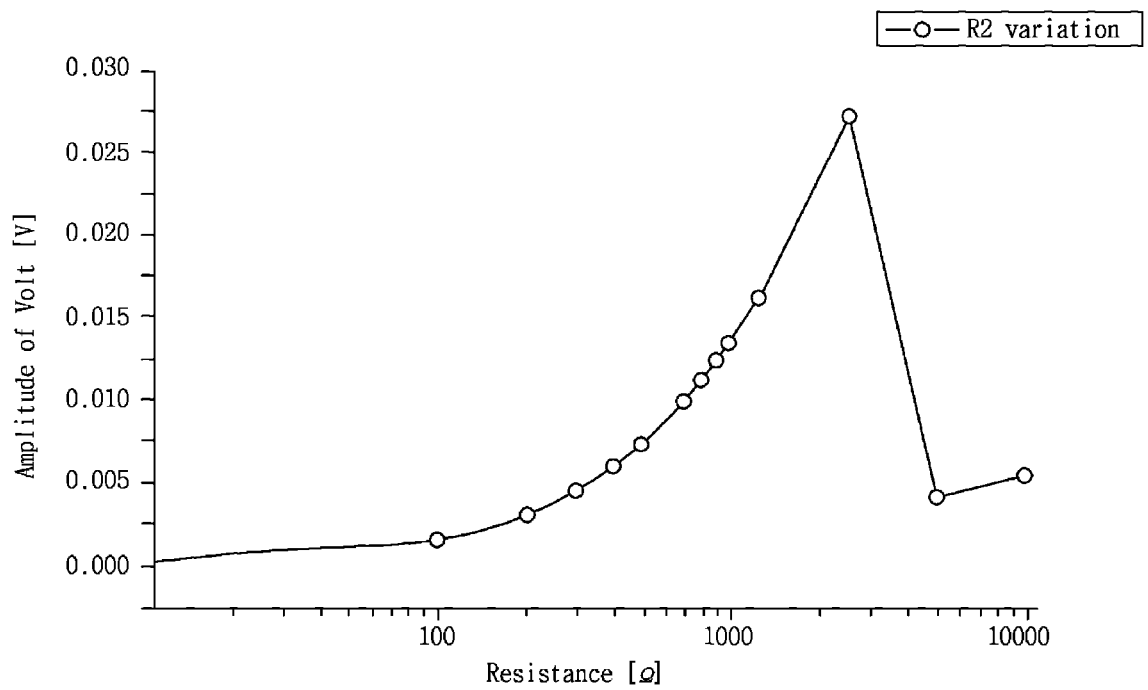
FIG. 7 is an exemplification view showing response characteristics of the output voltage in the pulse parameter according to the change of resistance R2.

FIG. 6 is an exemplification view showing variation of the output voltage in the pulse parameter according to variation of resistance R2 and FIG. 7 is an exemplification view showing response characteristics of the output voltage in the pulse parameter according to the variation of resistance R2. For reference, the resistance value is changed at a high voltage level. This indicates good linearity (sensitivity) response characteristic.

Figure 8:
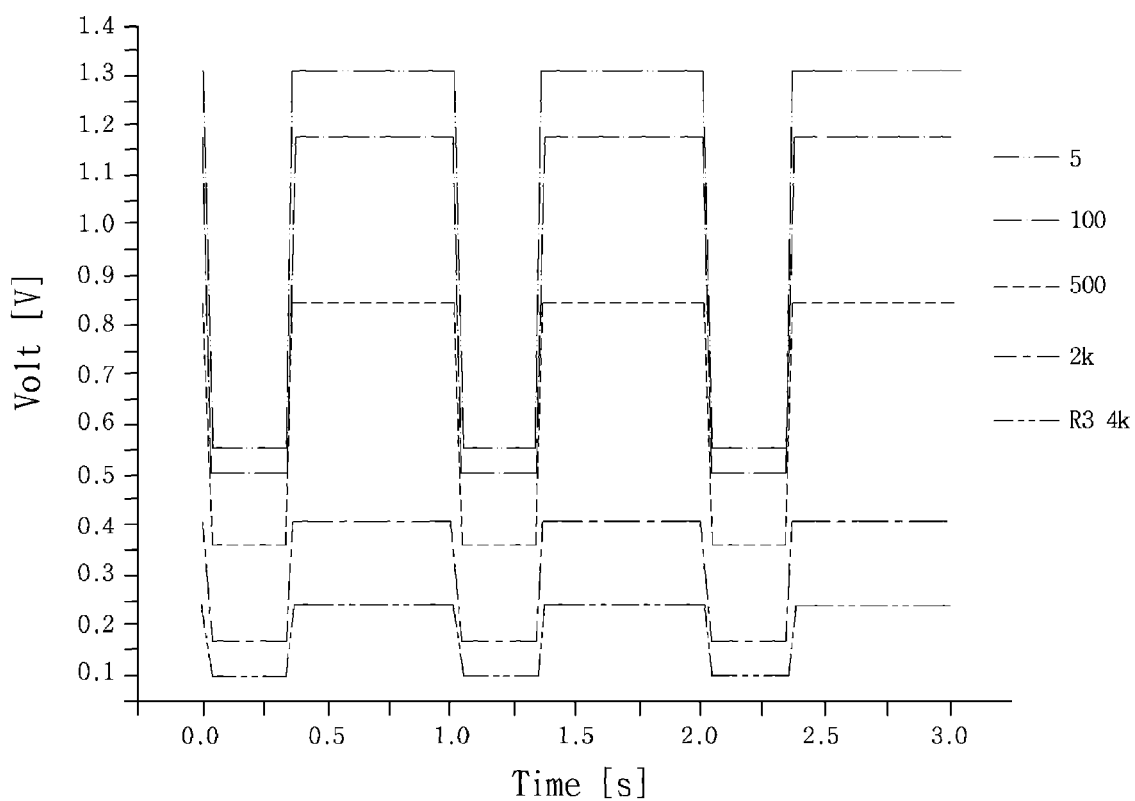
FIG. 8 is an exemplification view showing the output voltage in the pulse parameter according to variation of resistance R3.
Figure 9:
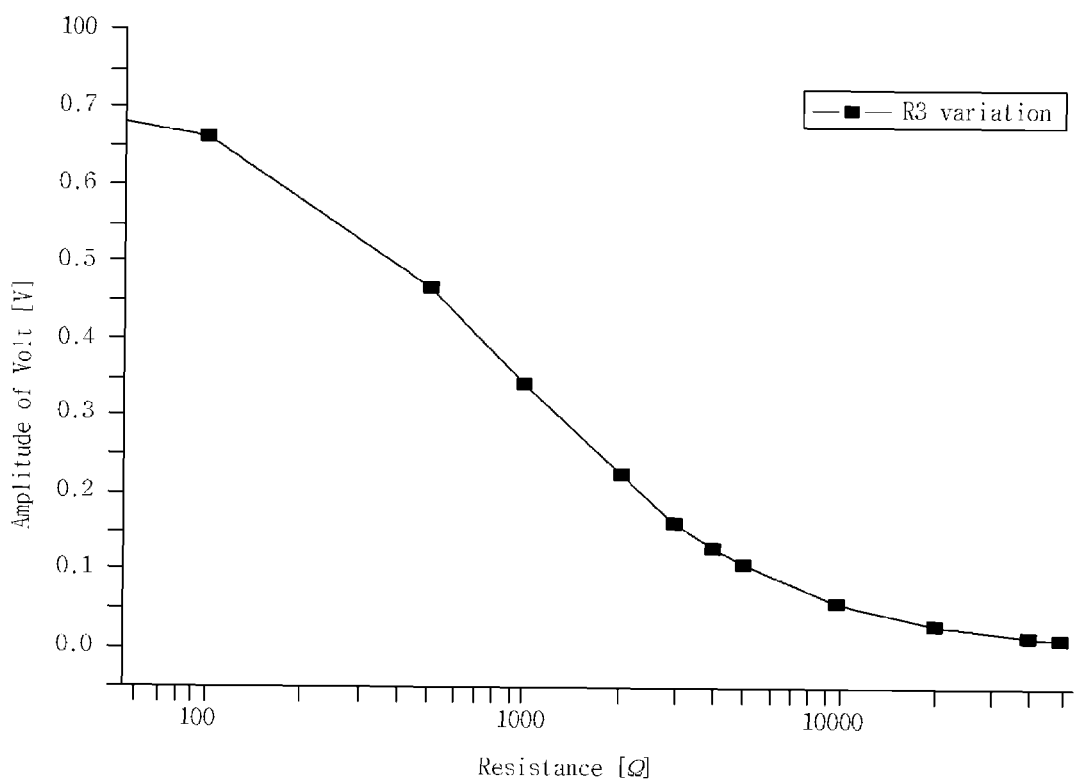
FIG. 9 is an exemplification view showing variation of output voltage of output parameters according to the variation of resistance R3.

FIG. 8 is an exemplification view showing the output voltage in the pulse parameter according to variation of resistance R3 and FIG. 9 is an exemplification view showing variation of output voltage of output parameters according to the variation of resistance R3.

Figure 10:
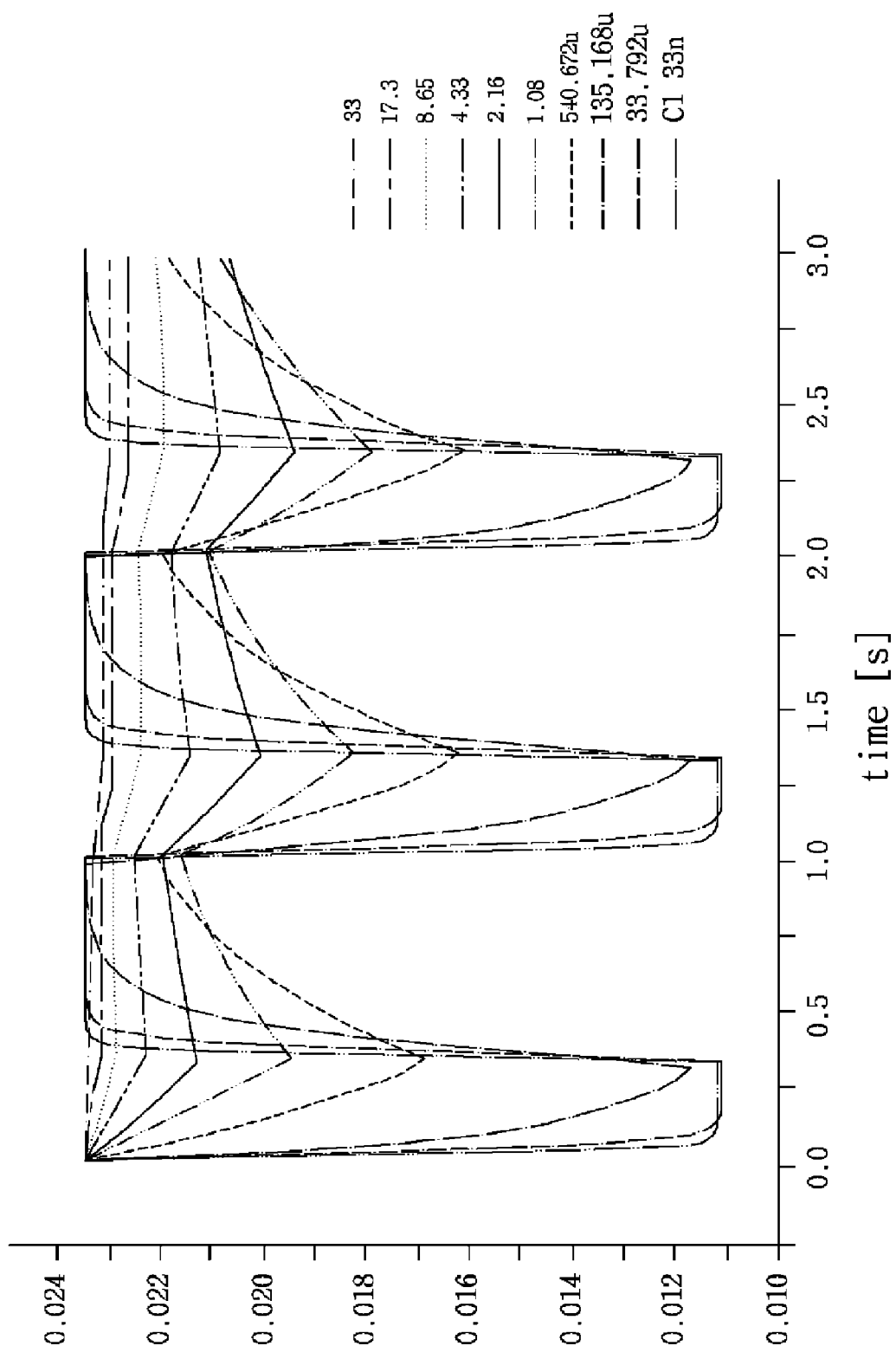
FIG. 10 is an exemplification view showing output data of an output parameter according to variation of capacitance C1.

FIG. 10 is an exemplification view showing output data of an output parameter according to variation of capacitance C1 and FIG. 11 is an exemplification view showing response characteristics of the output voltage in the output parameter according to the variation of capacitance C1. Also, FIG. 12 is an exemplification view showing response characteristics of rising time in the output parameter according to the variation of capacitance C1.

The abnormal simulation signal analysis module of the present invention is connected with a circuit simulator module, an analysis module, and the circuit simulator module and the analysis module and is configured of a system connection module having a one body code order system.

The respective modules will be described in detail. The circuit simulator module replicates the 4~20 mA instrument unsatisfied in the temperature environmental impact assessment as the simulation equivalent circuit. The main components of the corresponding instrument equivalent circuit are the passive elements such as a resistor, a coil, and a condenser, etc., and the active element such as a diode, etc. These elements derive the abnormal signal, which is the error information, by means of the inherent variation of the element according to the high temperature impact change. In order to perform the signal analysis according to a physical change in the environment, the simulator equivalent circuit is configured in the circuit simulator module using the passive elements and the active elements. A transient signal that is the output signal of the circuit is imported to the analysis module described later.

The circuit simulator module of the present invention is configured to analyze transient response characteristic of an R-L-C equivalent circuit according to an excess of temperature impact. At this time, the circuit simulator module is designed to have a function of estimating variation of time constant of the equivalent circuit according to variation of temperature, a function of estimating variation of element according to the variation of time constant and a function of analyzing accident conditions of the instrument according to the variation of element. Herein, the time constant is an index that indicates how rapidly or slowly any circuit, object, or control object can respond to an input from the external and is a quantitative parameter indicating the response characteristic of the equivalent circuit.

Next, the analysis module will be described in detail. The input and output of the analysis module is configured to be connected to the input and output of the circuit simulator module so that they are mutually connected. In other words, the transient signal information and the matters analyzed in the circuit simulator module are automatically imported to the analysis module. The analysis module, which is a module for performing a digital signal processing, includes a function of sorting and assessing the abnormal condition instrument, a function of validating the signal processing results, and an I/O interface function connectable to meters installed on the spot. The function of sorting and assessing the abnormal condition instrument includes a logic dividing the normal state (that is, OK state) and the abnormal state (that is, fail state) by comparing the environment calculating results by the MAAP code with the instrument EQ data every time and includes a List-up function sorting the error function according to the logic results.

Subsequently, the I/O interface function will be described. The I/O interface function can connect the meters installed on the spot to a PC base module of the present invention. The I/O interface function of the present invention includes a wire/wireless communication module, making it possible to conveniently transmit the data and remotely analyze them.

Next, a signal processing stage of the analysis module will be described. The abnormal signal obtained from the code of the circuit simulator module is transmitted to the signal processing stage for an application of an improved signal analysis and is subjected to a five-step signal processing. As a result, the response analysis thereof is displayed as time response and frequency response output. At this time, the output of the abnormal pulse signal is subjected to the next signal processing step for the quantitative analysis.

(1) Signal processing one stage function: a sort of a normal signal, a response analysis of a normal signal pulse according to environment (temperature) impact (2) Signal processing two stage functions: an analysis of an abnormal signal, a response analysis of an abnormal pulse signal modified according to environmental (temperature) impact (3) Signal processing three stage function: a quantitative improvement of a noise signal (application of signal improvement filtering function)

(4) Signal processing four stage function: a reconstruction of an abnormal pulse signal pulse (a reconstruction function to which a signal improvement algorithm approaching the normal pulse signal is applied)

(5) Signal processing five stage function: diagnosis and validation analysis of an abnormal signal Herein, the error diagnosis of the instrument after suffering from the signal processing three and four stages is sorted as the following six sorts.

(1) Up scale: an indication of an instrument is beyond the high scale (for example, RLC circuit element shorted)

(2) Down scale: an indication of an instrument is beyond the low scale (for example, RLC circuit element opened)

(3) Higher up scale than expected: an indication of an instrument is indicated to be higher than expected or is indicated to be higher as compared to a reading of other instruments (for example: RLC circuit impedance reducing variable)

(4) Lower down scale than expected: an indication of an instrument is indicated to be lower than expected or is indicated to be lower as compared to a reading of other instruments (for example: RLC circuit impedance increasing variation)

(5) Varying Excessively: excess vibration in a low and high range (for example: circuit L-C oscillation, 60 Hz noise impact)

(6) Unchanging: an invariable state to various physical conditions or parallel instruments (for example: a derivation of non-response conditions according to RLC circuit impedance excess increasing and reducing variation)

The results of the signal processing one to five stages can be simultaneously displayed on one screen and are briefly readjusted according to a predetermined rule. Also, the summarized results can be output and stored in the database so that they are practicable for the actual signal analysis in the spot of the nuclear power plant.

In addition, the analysis module may include a correlation output function linking short electricity error signal characteristic with long duration signal characteristic. The correlation output function, which is a function capable of summing two signals in a random time region, means a function of concurrently displaying an output signal of a severe accident condition (abnormal signal), a corrected signal, a normal signal (MAAP signal) output on one time axis. The function has a significant advantage in that the longitude and latitude time according to the accident scenario is a long term time unit and the time unit of the electrical error signal according to the environment is a short term time unit. In order words, since the negative pulse signal used in the present simulation experiment is also a short term time unit, in order to perform a real time signal analysis in view of an accident management, an on-spot operator needs to perform signal observations according to several situations on one time axis using a plurality of simulation input channels when there is the irregularly and temporarily generated the abnormal signal while maintaining a continuous long term time information so that the SUM signal processing function of a synthesis is added.

Next, the system linking module is to link the circuit simulator module with the analysis module, has the one body code order system. The commercial engine or the tools is operated on the system linking module so that the circuit simulator module and the analysis module can be easily changed and replaced, if necessary.

INDUSTRIAL APPLICABILITY

The present invention can accurately perform a quantitative analysis of an abnormal signal in a transient state by connecting an abnormal signal simulation analyzer (ASSA) module, which can perform an accurate quantitative analysis of an abnormal signal in a transient condition of environment (temperature) as an accident measuring scheme required by means of an US-NRC, with a network environment a wide band IT technology and by installing it in a safety associated instrumentation & control of a nuclear power plant in interior and exterior form. At this time, the abnormal signal analysis module is installed in a transmitting part of the instrument in an exterior form and the data of the output results can be connected and accessed to an internal communication network by means of a wireless facility such as a Bluetooth as a wire/wireless communication system and to a monitoring system without any restriction of time and space by means of an external ethernet mobile society network facility such as a PDA.

The invention claimed is:

1. An abnormal signal simulation analysis module for 4~20 mA instrument unsatisfied in a temperature environmental impact assessment, the abnormal signal simulation analysis module includes:
    the 4~20 mA instrument unsatisfied in a temperature environmental impact assessment;
    a circuit simulator module capable of configuring a simulation equivalent circuit of the instrument and obtaining an output signal by inputting a negative pulse;
    an analysis module receiving the output signal output from the circuit simulator module and then analyzing it; and
    an abnormal simulation signal analysis module including a system linking module that links the circuit simulator module to the analysis module.

2. The abnormal simulation signal analysis module according to claim 1, wherein the system linking module has a one body code order system.

3. The abnormal simulation signal analysis module according to claim 1, wherein a circuit configuration linked to the circuit simulator module and the analysis module and a test engine and a signal analysis code can be replaced.

4. The abnormal simulation signal analysis module according to claim 1, wherein the circuit simulator module includes a function of estimating variation of time constant of the equivalent circuit according to variation of temperature.

5. The abnormal simulation signal analysis module according to claim 1, wherein the circuit simulator module includes a function of estimating variation of element according to the variation of time constant.

6. The abnormal simulation signal analysis module according to claim 1, wherein the circuit simulator module includes a function of analyzing accident conditions of the instrument according to the variation of element.

7. The abnormal simulation signal analysis module according to claim 1, wherein the analysis module includes a function of classifying and assessing the instrument in an abnormal condition according to a result of a survivability assessment method.

8. The abnormal simulation signal analysis module according to claim 1, wherein the analysis module includes a function of validating a signal processing result.

9. The abnormal simulation signal analysis module according to claim 1, wherein the analysis module includes an I/O interface function connectable to meters installed on the spot.

10. The abnormal simulation signal analysis module according to claim 1, wherein the signal analysis module reconstructs the abnormal signal in a transient state to a signal in a normal state.

11. A signal analysis method for 4~20 mA instrument unsatisfied in a temperature environmental impact assessment, the signal analysis method includes:
    a first step of configuring a simulation equivalent circuit of the 4~20 mA instrument unsatisfied in a temperature environmental impact assessment;
    a second step of obtaining an output signal by inputting a negative pulse to the equivalent circuit;
    a third step of receiving the output signal output from the second step and analyzing it, where the steps process by a processor.

12. The method according to claim 11, wherein the first to third steps are performed by means of a one body code order system.

13. The method according to claim 11, wherein the second step includes a second-first step of estimating variation of time constant of the equivalent circuit according to variation of temperature.

14. The method according to claim 13, wherein the second step includes a second-second step of estimating variation of element according to the variation of time constant.

15. The method according to claim 14, wherein the second step circuit simulator module includes a second-third step of analyzing accident conditions of the instrument according to the variation of element.

16. The method according to claim 11, wherein the third step includes a third-first step of classifying and assessing the instrument in an abnormal condition according to a result of a survivability assessment method.

17. The method according to claim 16, wherein the third step includes a third-second step of validating a signal processing result.

18. The method according to claim 17, wherein the third step includes a third-third step of directly connecting to meters installed on the spot.

* * * * *